(12) United States Patent
Nishimura et al.

(10) Patent No.: US 11,397,280 B2
(45) Date of Patent: Jul. 26, 2022

(54) INFORMATION PROCESSING SYSTEM, NON-TRANSITORY STORAGE MEDIUM STORING PROGRAM, AND INFORMATION PROCESSING METHOD

(71) Applicant: TOYOTA JIDOSHA KABUSHIKI KAISHA, Toyota (JP)

(72) Inventors: Kazuya Nishimura, Okazaki (JP); Yoshihiro Oe, Kawasaki (JP); Jun Goto, Toyota (JP); Hirofumi Kamimaru, Fukuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 208 days.

(21) Appl. No.: 16/534,006

(22) Filed: Aug. 7, 2019

(65) Prior Publication Data
US 2020/0124765 A1 Apr. 23, 2020

(30) Foreign Application Priority Data
Oct. 23, 2018 (JP) .............................. JP2018-199415

(51) Int. Cl.
*G09F 17/00* (2006.01)
*G01W 1/02* (2006.01)
(Continued)

(52) U.S. Cl.
CPC .......... *G01W 1/02* (2013.01); *G06F 16/90335* (2019.01); *G10L 25/51* (2013.01); *H04R 1/025* (2013.01); *H04W 4/029* (2018.02); *H04W 4/38* (2018.02); *H04W 4/44* (2018.02); *H04L 67/12* (2013.01); *H04L 67/42* (2013.01); *H04R 2499/13* (2013.01)

(58) Field of Classification Search
CPC ......... H04W 4/38; H04W 4/44; H04W 4/029; H04W 4/46; H04W 4/48
See application file for complete search history.

(56) References Cited

U.S. PATENT DOCUMENTS

| 2012/0173530 | A1* | 7/2012 | Kurciska | G08G 1/0112 707/738 |
| 2017/0213459 | A1* | 7/2017 | Ogaz | G08G 1/166 |

(Continued)

FOREIGN PATENT DOCUMENTS

| CN | 104204724 A | 12/2014 |
| CN | 105258733 A | 1/2016 |

(Continued)

*Primary Examiner* — Yves Dalencourt
(74) *Attorney, Agent, or Firm* — Oblon, McClelland, Maier & Neustadt, L.L.P.

(57) ABSTRACT

An information processing system includes: a plurality of vehicles; and a server configured to communicate with the plurality of vehicles, wherein each of the plurality of vehicles is configured to detect wind information by using a wind detection device mounted on each of the plurality of vehicles, and send probe data to the server, the probe data including the wind information and position information on each of the plurality of vehicles at a time when the wind information was detected, and the server is configured to store the probe data received from the plurality of vehicles in a database, and provide information to a client by using the probe data stored in the database.

7 Claims, 4 Drawing Sheets

(51) Int. Cl.
*H04W 4/38* (2018.01)
*H04W 4/44* (2018.01)
*H04W 4/029* (2018.01)
*H04R 1/02* (2006.01)
*G06F 16/903* (2019.01)
*G10L 25/51* (2013.01)
*H04L 67/01* (2022.01)
*H04L 67/12* (2022.01)

(56) References Cited

U.S. PATENT DOCUMENTS

| | | | | |
|---|---|---|---|---|
| 2018/0203455 A1* | 7/2018 | Cronin | ............... | G01C 21/3492 |
| 2019/0016341 A1* | 1/2019 | Nelson | .................. | B60W 40/06 |
| 2019/0031236 A1* | 1/2019 | Shiraishi | .................. | B62D 6/04 |

FOREIGN PATENT DOCUMENTS

| | | | |
|---|---|---|---|
| JP | 2007-237789 A | 9/2007 |
| JP | 2008-254487 A | 10/2008 |
| JP | 2009-157790 A | 7/2009 |
| JP | 2011-133427 A | 7/2011 |
| JP | 2013-79891 A | 5/2013 |
| JP | 2014-224719 A | 12/2014 |

* cited by examiner

| TIME INFORMATION | POSITION INFORMATION | WIND INFORMATION ||
| --- | --- | --- | --- |
| | | WIND SPEED | WIND DIRECTION |
| **// : | ,  |  | ** |
| **// : | ,  |  | ** |
| . . . | . . . | . . . | . . . |

INFORMATION PROCESSING SYSTEM, NON-TRANSITORY STORAGE MEDIUM STORING PROGRAM, AND INFORMATION PROCESSING METHOD

INCORPORATION BY REFERENCE

The disclosure of Japanese Patent Application No. 2018-199415 filed on Oct. 23, 2018 including the specification, drawings and abstract is incorporated herein by reference in its entirety.

BACKGROUND

1. Technical Field

The present disclosure relates to an information processing system, a non-transitory storage medium storing a program, and an information processing method.

2. Description of Related Art

Techniques for utilizing the information on a wind speed and a wind direction are known. For example, Japanese Patent Application Publication No. 2008-254487 (JP 2008-254487 A) discloses a configuration for use in a vehicle equipped with a video camera. In this configuration, the video of the area ahead of the vehicle in the traveling direction is shot, a side wind generated ahead of the vehicle in the traveling direction is estimated based on the swaying condition of a swaying object in the wind detected in the video signal, and a warning is output to the driver according to the degree of strength of the side wind. In addition, Japanese Patent Application Publication No. 2014-224719 (JP 2014-224719 A) discloses a configuration for use in a vehicle equipped with an ultrasonic wind direction and speed sensor. In this configuration, an ultrasonic wind direction and speed sensor is stored inside the vehicle during low speed traveling. This ultrasonic wind direction and speed sensor is stuck out during high speed traveling of the vehicle to detect the wind direction and the wind speed for performing traveling control according to the detected data.

SUMMARY

However, the related techniques that utilize the wind information is not necessarily convenient. For example, the technique described in Japanese Patent Application Publication No. 2008-254487 (JP 2008-254487 A) cannot estimate a side wind when there is no swaying object ahead of the vehicle in the traveling direction. In addition, the technique described in Japanese Patent Application Publication No. 2014-224719 (JP 2014-224719 A), which can detect the wind direction and the wind speed only at the position of the host vehicle, cannot perform traveling control in consideration of the wind direction and the wind speed ahead of the vehicle in the traveling direction. Meanwhile, instead of utilizing the wind information, it is also possible to utilize the wind prediction information typically provided by meteorological organizations such as Japan Meteorological Agency. However, the reliability of the wind prediction information is not necessarily high and, in addition, the distribution of meshes, which are geographical unit cells to which wind prediction information is provided, is relatively coarse. For this reason, the wind prediction information cannot necessarily be used instead of the wind information.

The present embodiments improves the convenience of the technique of utilizing wind information.

A first aspect of the disclosure provides an information processing system. The information processing system includes: a plurality of vehicles; and a server configured to communicate with the plurality of vehicles, wherein each of the plurality of vehicles is configured to detect wind information by using a wind detection device mounted on each of the plurality of vehicles, and send probe data to the server, the probe data including the wind information and position information on each of the plurality of vehicles at a time when the wind information was detected, and the server is configured to store the probe data received from the plurality of vehicles in a database, and provide information to a client by using the probe data stored in the database.

A second aspect of the disclosure provides a non-transitory storage medium storing a program for causing an information processing device configured to communicate with a plurality of vehicles to execute: receiving probe data from each of the plurality of vehicles, the probe data including wind information detected by using a wind detection device mounted on each of the plurality of vehicles and position information on each of the plurality of vehicles at a time when the wind information was detected; storing the probe data in a database, the probe data being received from the plurality of vehicles; and providing information to a client by using the probe data stored in the database.

A third aspect of the disclosure provides an information processing method performed by an information processing system including a plurality of vehicles and a server configured to communicate with the plurality of vehicles. The information processing method includes: detecting, by each of the plurality of vehicles, wind information by using a wind detection device mounted on each of the plurality of vehicles; sending, by each of the plurality of vehicles, probe data to the server, the probe data including the wind information and position information on each of the plurality of vehicles at a time when the wind information was detected; storing, by the server, the probe data in a database, the probe data being received from the plurality of vehicles; and providing, by the server, information to a client by using the probe data stored in the database.

According to the information processing system, the non-transitory storage medium storing a program, and the information processing method in one embodiment of the present disclosure, the convenience of the technique of utilizing wind information is improved.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

An embodiment of the present disclosure will be described below.

(Configuration of Information Processing System)

Figure 1:
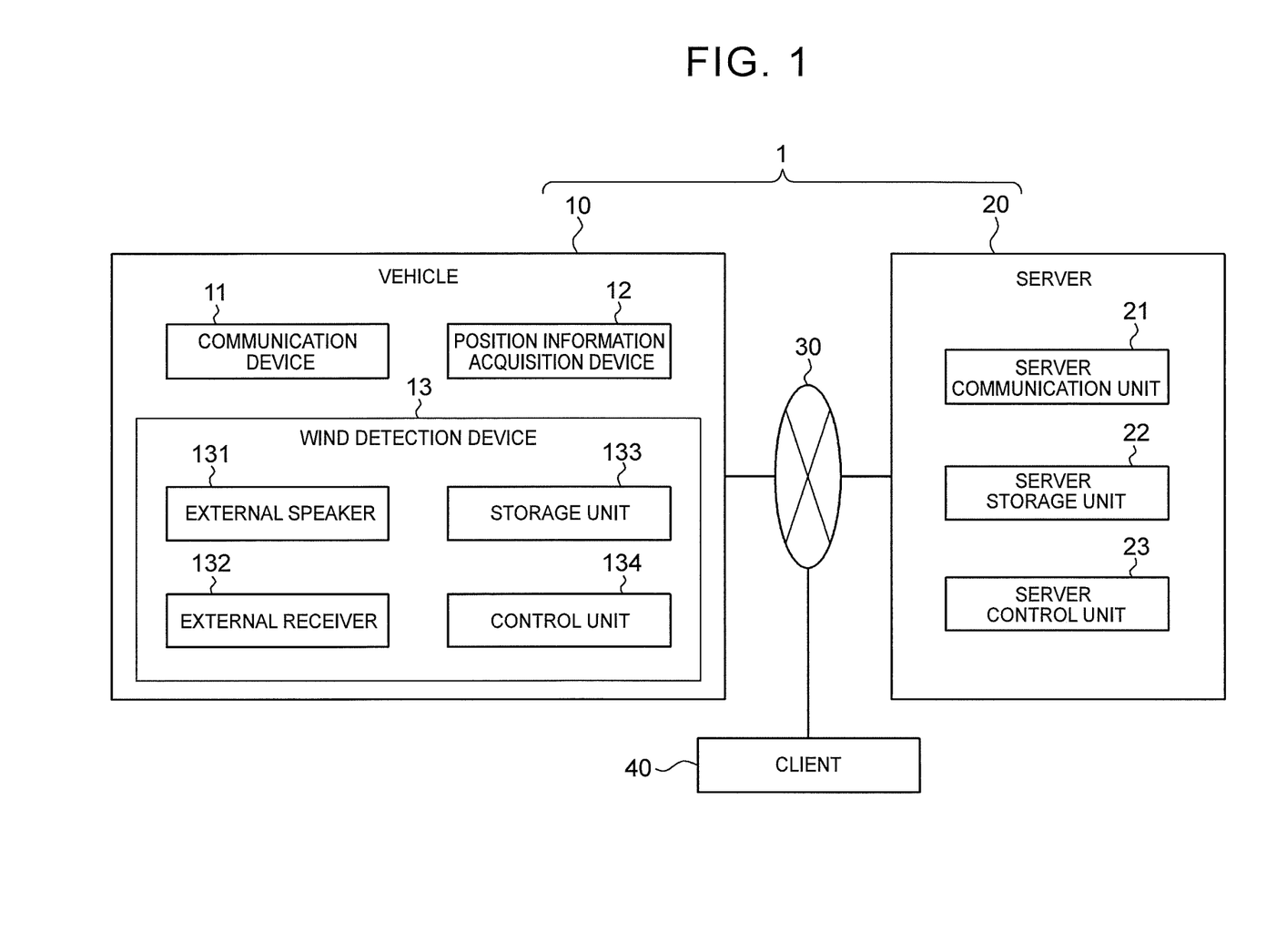
FIG. 1 is a block diagram showing a schematic configuration of an information processing system according to one embodiment of the present disclosure.

The outline of an information processing system 1 according to one embodiment of the present disclosure will be described below with reference to FIG. 1. The information processing system 1 includes a plurality of vehicles 10 and a server 20. The vehicle 10 is, for example, an automobile but is not limited to it; the vehicle 10 may be any vehicle. Only one vehicle 10 is shown in FIG. 1 for the sake of description. The server 20 includes one information processing device or a plurality of information processing devices (for example, server devices) that can communicate with each other. The vehicle 10 and the server 20 can communicate via a network 30, for example, via a mobile communication network or the Internet. In addition, the server 20 can communicate with a client 40 via the network 30. In this embodiment, the client 40 is an automobile, such as the vehicle 10 or another vehicle, but is not limited to them; the client 40 may be any device such as a smartphone or a computer.

First, the outline of this embodiment will be described below, and the details will be described later. Each vehicle 10 detects the wind information, which includes the wind speed and wind direction at the position of the host vehicle, using a wind detection device 13 mounted on a host device. Then, the vehicle 10 sends probe data, which includes the detected wind information and the position information on the host vehicle at a time when the wind information was detected, to the server 20. The server 20 stores the probe data, received from a plurality of the vehicles 10, in a database. Then, the server 20 provides the information to the client 40 using the probe data stored in the database.

As described above, this embodiment uses the probe data that includes the wind information detected by the plurality of the vehicles 10 actually traveling on a road, improving the reliability, accuracy, and real-time ability of the provided data. This, in turn, improves the convenience of the technique that utilizes the wind information.

Next, the components of the information processing system 1 will be described below in detail.

(Configuration of Vehicle)

As shown in FIG. 1, the vehicle 10 includes a communication device 11, a position information acquisition device 12, and a wind detection device 13. The communication device 11, position information acquisition device 12, and wind detection device 13 are connected to each other in such a way that they can communicate, for example, via a vehicle-mounted network such as Controller Area Network (CAN) or a dedicated line.

The communication device 11 is an in-vehicle communication device such as a Data Communication Module (DCM). More specifically, the communication device 11 includes a processor, a memory, and a communication module for connection to the network 30. This communication module is a communication module conforming to a mobile communication standard such as 4G (4th Generation) and 5G (5th Generation) but is not limited to these modules. In this embodiment, the vehicle 10 is connected to the network 30 via the communication device 11.

The communication device 11 sends probe data to the server 20. The probe data includes the wind information, detected by the wind detection device 13, and the position information and the time information on the vehicle 10 at a time when the wind information was detected, as will be described later. However, the probe data is not limited to the information described above but may include any information about the vehicle 10. For example, the probe data may include the information on the vehicle 10 such as the identification information, vehicle information (for example, vehicle type, vehicle height, weight, and information on whether the vehicle is autonomous), vehicle control information (for example, speed, acceleration, and steering angle), position information, movement route information, and current time information. The probe data may be sent any time. For example, the probe data may be sent each time the wind information is detected by the wind detection device 13 or may be sent after being stored in the memory for a certain period.

The position information acquisition device 12 is a device that acquires the position information on the vehicle 10. More specifically, the position information acquisition device 12 includes a receiver compatible with a satellite positioning system. For example, the receiver may include is a Global Positioning System (GPS) receiver. In this embodiment, the vehicle 10 acquires the position information on the host vehicle using the position information acquisition device 12. The position information acquisition device 12 acquires the position information on the vehicle 10 at a time when the wind information was detected by the wind detection device 13 as will be described later, and outputs the acquired position information to the communication device 11.

The wind detection device 13 is a device that detects the wind information on the vehicle 10 at the current position. The wind information includes at least one of the wind speed and the wind direction. However, the wind information is not limited to the information described above but may include any information on the wind such as the wind force. More specifically, the wind detection device 13 includes an external speaker 131, one or more external receivers 132, a storage unit 133, and a control unit 134.

The external speaker 131 is a speaker installed in the vehicle 10 in such a way that sound can be output toward the outside of the vehicle. The external speaker 131 may be a speaker used only by the wind detection device 13 or may be a sound output device already mounted on the vehicle 10 such as a horn or a vehicle approach notification device. The sound output by the external speaker 131 may be an audible sound or an inaudible sound.

The external receiver 132 is a microphone installed in the vehicle 10 in such a way that the sound output from the external speaker 131 to the outside of the vehicle can be collected.

The storage unit 133 includes one or more memories. In this embodiment, the "memory" is a semiconductor memory, a magnetic memory, or an optical memory but is not limited to these memories. Each memory included in the storage unit 133 may function as a main storage device, an auxiliary storage device, or a cache memory. The storage unit 133 stores any information used for the operation of the wind detection device 13. For example, the storage unit 133 may store system programs, application programs, embedded software, the information on the installation positions of the external speaker 131 and the external receivers 132 in the vehicle 10, and the information on the distance from the external speaker 131 to each external receiver 132. The information stored in the storage unit 133 may be updatable, for example, with the information acquired from the network 30 via the communication device 11.

The control unit 134 includes one or more processors. In this embodiment, the "processor" is a general-purpose processor or a dedicated processor specialized for specific processing. Note that the processor is not limited to these processors; for example, an Electronic Control Unit (ECU) mounted in the vehicle 10 may function as the control unit 134. The control unit 134 controls the overall operation of the wind detection device 13.

For example, the control unit 134 detects the wind information, which includes at least one of the wind speed and the wind direction, using the external speaker 131 and the external receivers 132. The algorithm for detecting the wind information will be described below in detail. The control unit 134 causes the external speaker 131 to output sound. The control unit 134 measures the arrival time of sound from the external speaker 131 to each external receiver 132. The control unit 134 calculates the wind speed in the direction from the external speaker 131 to each external receiver 132 using, for example, expression 1 given below.

$$w=(L/t)-(C+Av) \qquad (1)$$

In expression 1, w is the wind speed in the direction from the external speaker 131 to the external receiver 132, L is the distance from the external speaker 131 to the external receiver 132, t is the arrival time of the sound from the external speaker 131 to the external receiver 132, C is the speed of sound, and v is the speed of the vehicle 10 (vehicle speed). The correction coefficient A of the vehicle speed v is determined based on the direction from the external speaker 131 to the external receiver 132 and the traveling direction of the vehicle 10. The corrected vehicle speed Av is a component of the speed of the vehicle 10 along the direction from the external speaker 131 to the external receiver 132.

Figure 2:
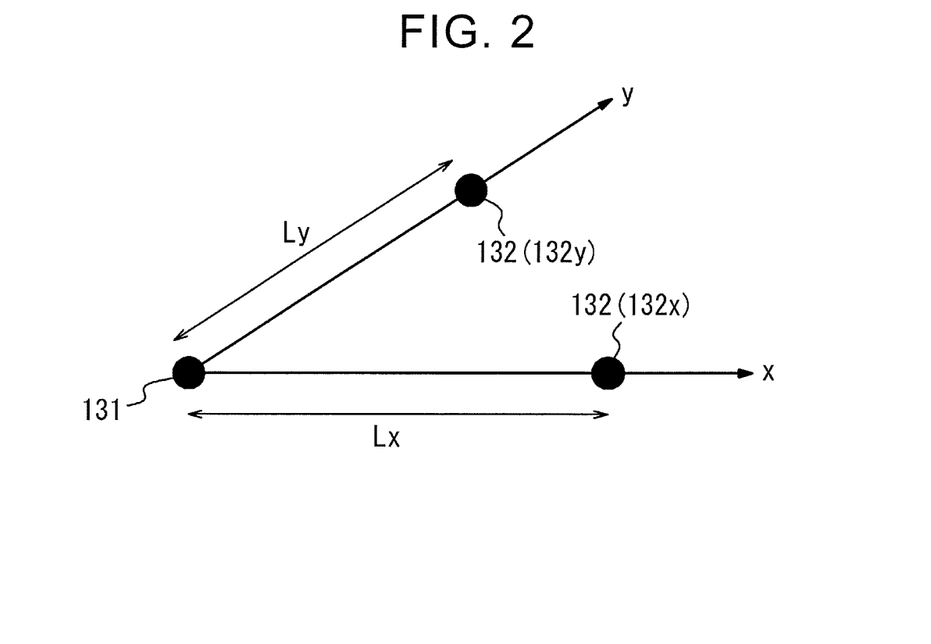
FIG. 2 is a diagram showing a wind information detection method performed by a wind detection device.

When the wind detection device 13 includes two or more external receivers 132, the control unit 134 detects the wind information, which includes the wind speed and the wind direction at the position of the vehicle 10, based on the wind speed w in the direction from the external speaker 131 to each external receiver 132. For example, with the installation position of the external speaker 131 as the origin, FIG. 2 shows two coordinate axes, x and y, each extending from the origin toward the installation position of each of the two external receivers 132x and 132y. The distances Lx and Ly, from the external speaker 131 to the external receivers 132x and 132y, are stored in the storage unit 133 in advance. The control unit 134 detects each of the wind speeds wx and wy in the x-axis and y-axis directions as a vector using expression 1 described above. Then, based on the composite vector of these vectors and the direction of the vehicle 10, the control unit 134 detects the wind speed and the wind direction as the wind information. Although the direction of the vehicle 10 is detected using, for example, the gyro sensor and the geomagnetic sensor provided in the vehicle 10, the detection method is not limited to this method but any method may be used.

On the other hand, when the wind detection device 13 includes one external receiver 132, the control unit 134 detects the wind speed in the direction from the external speaker 131 to the external receiver 132 as the wind information using expression 1 described above. In such a case, the wind information may not include the wind direction.

The wind information may be detected using not only the method descried in the above example but also any algorithm. More specifically, to improve the detection accuracy, expression 1 given above may be corrected and expanded considering any parameters, such as the air temperature, humidity, and air resistance of the vehicle 10, that may affect the detection of the wind speed.

The control unit 134 outputs the detected wind information to the communication device 11. In addition, when detecting the wind information, the control unit 134 outputs an instruction to acquire the position information to the position information acquisition device 12. In response to this acquisition instruction, the position information acquisition device 12 acquires the position information on the vehicle 10 at a time when the wind information was detected and outputs the acquired position information to the communication device 11. Note that the wind information detection time and the position information acquisition time do not have to be exactly the same.

(Configuration of Server)

As shown in FIG. 1, the server 20 includes a server communication unit 21, a server storage unit 22, and a server control unit 23.

The server communication unit 21 includes a communication module for connection to the network 30. For example, the server communication unit 21 may include a communication module conforming to the wired Local Area Network (LAN) standard. In this embodiment, the server 20 is connected to the network 30 via the server communication unit 21.

The server storage unit 22 includes one or more memories. Each memory included in the server storage unit 22 may function as a main storage device, an auxiliary storage device, or a cache memory. The server storage unit 22 stores any information used for the operation of the server 20. For example, the server storage unit 22 may include system programs, application programs, road map data, and a database in which the probe data received from the vehicles 10 is stored. The information stored in the server storage unit 22 may be updatable, for example, with the information acquired from the network 30 via the server communication unit 21.

The server control unit 23 includes one or more processors. The server control unit 23 controls the overall operation of the server 20.

Figure 3:
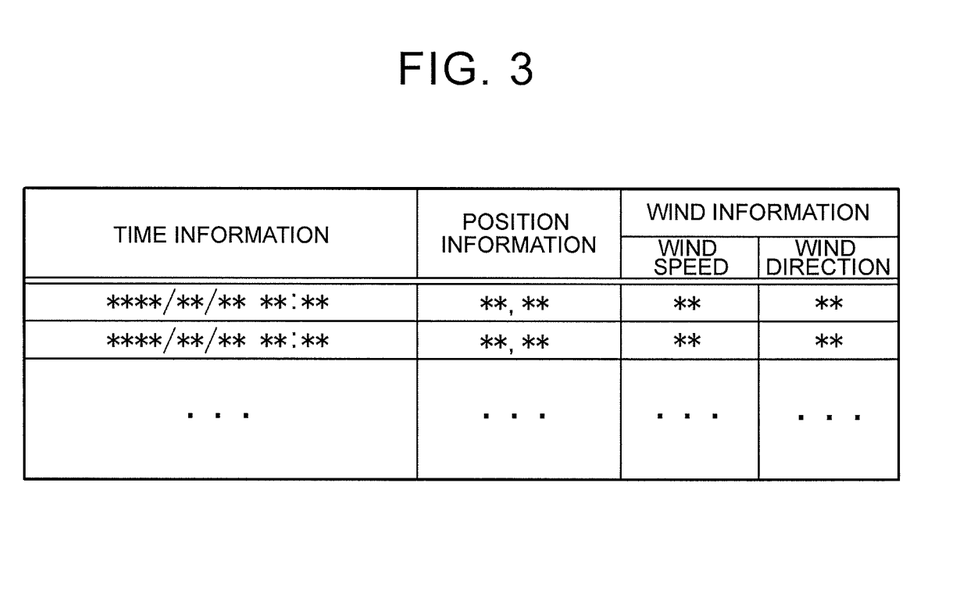
FIG. 3 is a diagram showing an example of a database stored in a server.

For example, the server control unit 23 receives probe data from a plurality of vehicles 10 via the server communication unit 21. The server control unit 23 stores the received probe data in the database in server storage unit 22. In the example of the database shown in FIG. 3, each row indicates probe data which includes the time information, position information, and wind information. Note that the structure of the database is not limited to the structure shown in this example but any structure may be used.

The server control unit 23 provides information to the client 40 using the probe data stored in the database. The information may be provided in response to a request from the client 40 (e.g., pull delivery) or may automatically be provided by the server control unit 23 (e.g., push delivery). When providing the information using the probe data, the probe data itself may be provided or any information generated using the probe data may be provided. For example, the map information generated by mapping the wind information onto a map may be provided to the client 40. The information generated using probe data is not limited to such map information but any other information may also be generated.

When providing the information, the server control unit 23 may determine the information to be provided to the client 40 based on at least one of the following two types of information on the client 40: movement route information and attribute information. The "movement route information" is the information indicating a movement route along which the movable client 40, such as an automobile or a smartphone, will move to any predetermined destination. The "attribute information" is the information indicating any of the attributes of the client 40; for example, the client type (whether the client is an automobile, a smartphone, or a computer), the vehicle information (such as the vehicle type of an automobile, the vehicle height, the vehicle weight, and whether the vehicle is autonomous), and the model and the specification of a smartphone. The information on autonomous driving includes, for example, the information on levels 1 to 5 defined by the SAE (Society of Automotive Engineers) standard, but is not limited to this definition and any definition may be used. The movement route information and the attribute information may be sent from the client 40 to the server 20, or may be stored in advance in the server storage unit 22.

More specifically, the server control unit 23 may provide the wind information on the movement route, indicated by the movement route information on the client 40, to the client 40. This configuration allows the user of the client 40 to recognize in advance the wind information (for example, wind information on the route ahead of the vehicle in the traveling direction) along the movement route.

More specifically, the server control unit 23 may generate strong-wind area information, which indicates a geographical area in which the wind speed is equal to or higher than a predetermined threshold value, and may provide the generated information to the client 40. This threshold value may be a predetermined value or may be determined based on the attribute information on the client 40. When the threshold value is determined based on the attribute information on the client 40, the following attribute information is considered. For example, when the client type indicated by the attribute information is an "automobile", the higher the height of the automobile is, the more susceptible the automobile is to the wind. For this reason, as the height of the automobile indicated by the attribute information on the client 40 is higher, the server control unit 23 may provide the strong-wind area information to the client 40 using a smaller threshold value. In addition, the susceptibility to the wind of an automobile differs depending not only on the height of the automobile but also on other attributes, such as the weight of the automobile or the type of the automobile (such as whether the automobile is a passenger car or a truck). For this reason, the server control unit 23 may provide the strong-wind area information to the client 40 using a threshold value according not only to the attribute information on the height of the automobile but also to any other attribute information such the weight or the type of the automobile. Also, note that a person who travels by carrying a smartphone is more susceptible to a wind than an automobile. For this reason, when the client type indicated by the attribute information is a "smartphone", the server control unit 23 may provide the strong-wind area information to the client 40 using a threshold value smaller than that used when the client type is an "automobile". The configuration described above allows appropriate strong-wind area information to be provided according to the attribute information on the client 40.

More specifically, based on the wind information on the movement route indicated by the movement route information on the client 40, the server control unit 23 may provide more appropriate movement route information to the client 40. For example, when the wind speed on the movement route is equal to or higher than a predetermined threshold, the server control unit 23 may generate another piece of movement route information indicating another lower-wind-speed movement route and provide the generated movement route information to the client 40. This predetermined threshold value may be a predetermined value or may be determined based on the attribute information on the client 40 as described above. This configuration allows another lower-wind-speed movement route to be presented to the client 40 when the wind is strong.

More specifically, when it is determined based on the attribute information that the client 40 is an autonomous driving automobile, the server control unit 23 may generate autonomous driving control information to be used for the autonomous driving of the automobile and provide the generated information to the client 40. The autonomous driving control information may include the information for controlling the vehicle speed and the steering angle according to the wind information on the current position of the client 40 or the wind information on the movement route (for example, ahead of the route in the traveling direction) indicated by the movement route information. For example, as the wind speed indicated by the wind information is higher, the server control unit 23 may provide, to the client 40, the autonomous driving control information that lowers the upper limit of the vehicle speed and/or reduces a sudden change in the steering angle. This configuration allows for more appropriate autonomous driving according to the wind information on the current position or on the movement route of the client 40.

Thus, according to the configuration in which the information to be provided to the client 40 is determined based on at least one of the movement route information and the attribute information on the client 40, appropriate information can be provided according to the movement route information and/or the attribute information on the client 40. Note that the method for determining the information to be provided to the client 40 is not limited to the method described above; any other method based on at least one of the movement route information and the attribute information of the client 40 may also be used.

When providing the information, the server control unit 23 may provide the information using all the probe data stored in the database or using a part of the probe data extracted from the probe data, stored in the database, based on a predetermined condition.

More specifically, the server control unit 23 may provide the information using the probe data which is stored in the database and whose position information indicates a position belonging to a predetermined geographical area. This configuration allows the information to be provided using only the probe data that includes the wind information detected in a predetermined geographical area, making it possible to provide the information for each geographical area (for example, the average wind information may be provided for each geographical area). The predetermined geographical area may be designated by the client 40, may be automatically determined by the server control unit 23, or may be stored in advance in the server storage unit 22.

Similarly, the server control unit 23 may provide the information using the probe data which is stored in the database and whose time information indicates a time belonging to a predetermined time zone. This configuration allows the information to be provided using only the probe data that includes the wind information detected in a predetermined time zone, making it possible to provide the information for each time zone (for example, the past wind information or the latest time-zone wind information may be provided). The predetermined time zone may be designated by the client 40, may be automatically determined by the server control unit 23, or may be stored in advance in the server storage unit 22.

Thus, in this configuration, the information may be provided using a part of the probe data that is stored in the database and is extracted based on a predetermined condition. For example, it is possible to provide the information for each geographical area or for each time zone as described above. Note that the information may be provided using a part of the probe data that is stored in the database and is extracted based not only on a geographical area condition or a time zone condition described above but also on any other conditions. For example, when providing the wind information on a movement route, indicated by the movement route information on the client 40, to that client 40, the server control unit 23 provides the information using the probe data which is stored in the database and whose position information indicates a position on the movement route of the client 40. Moreover, when extracting the probe data, a combination of two or more conditions (for example, a geographical area condition and a time zone condition) may be used.

(Operation Flow of Vehicle)

Figure 4:
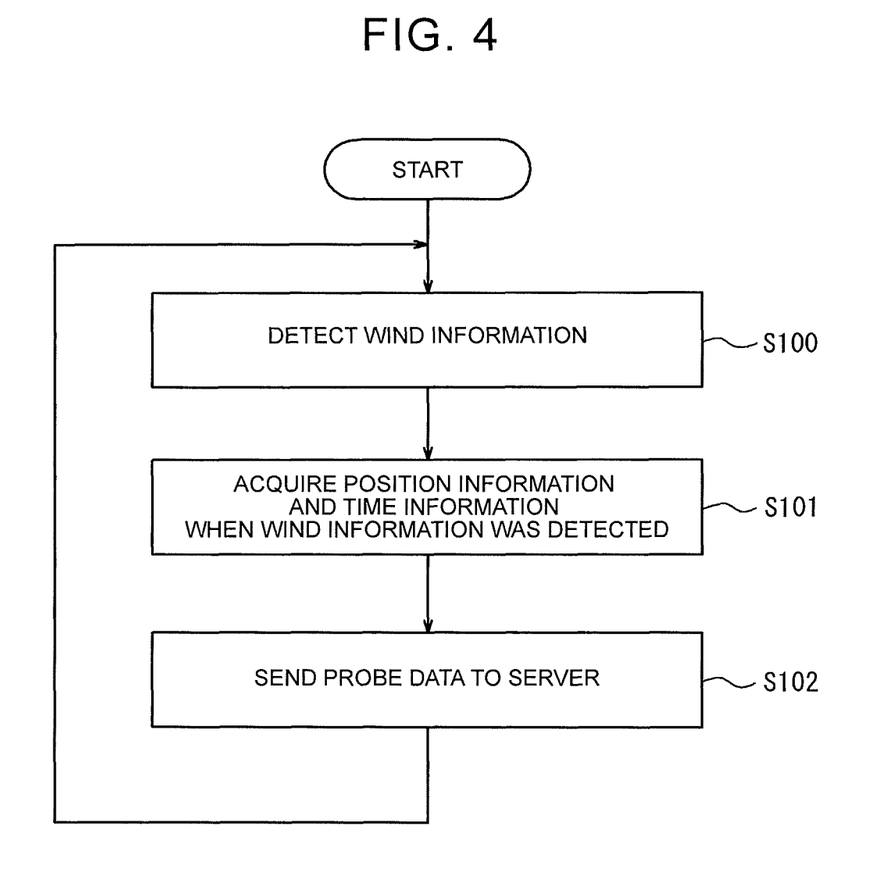
FIG. 4 is a flowchart showing the operation of a vehicle.

The operation flow of the vehicle 10 will be described below with reference to FIG. 4. This operation flow is repeated while the vehicle 10 travels.

Step S100: The vehicle 10 detects the wind information using the wind detection device 13. The wind information includes at least one of the wind speed and the wind direction.

Step S101: The vehicle 10 acquires the position information and the time information on the host vehicle at a time when the wind information was detected.

Step S102: The vehicle 10 sends the probe data, which includes the wind information, position information, and time information, to the server 20.

(Operation Flow of Server)

Figure 5:
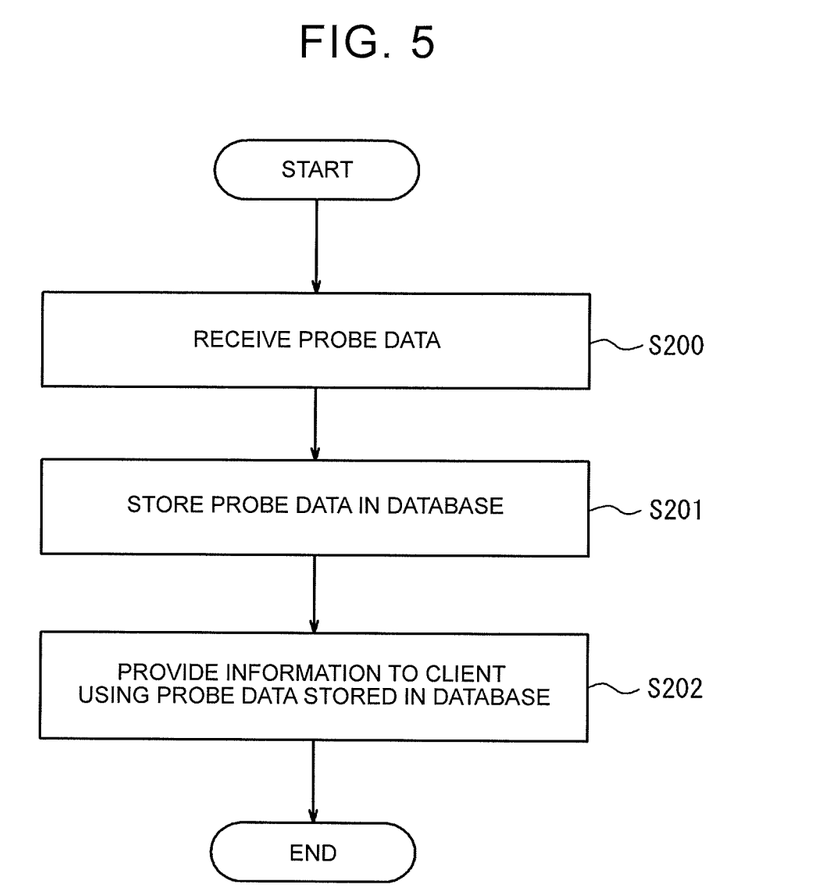
FIG. 5 is a flowchart showing the operation of the server.

The operation flow of the server 20 will be described below with reference to FIG. 5.

Step S200: The server 20 receives probe data from a plurality of the vehicles 10.

Step S201: The server 20 stores the received probe data in the database.

Step S202: The server 20 provides the information to the client 40 using the probe data stored in the database.

As described above, according to the information processing system 1 in this embodiment, each of a plurality of the vehicles 10 detects the wind information using the wind detection device 13 mounted on the host vehicle. Each of the plurality of the vehicles 10 sends the probe data, which includes the detected wind information and the other information including the position information on the host vehicle at a time when the wind information was detected, to the server 20. The server 20 stores the probe data, received from the plurality of the vehicles 10, in the database. Then, the server 20 provides the information to the client 40 using the probe data stored in the database. This configuration uses the probe data that includes the wind information detected by a plurality of the vehicles 10 actually traveling on the road, thus increasing the reliability, accuracy, and real-time ability of the provided information. Therefore, this embodiment improves the convenience of the technique that utilizes the wind information.

Although the present disclosure has been described with reference to the drawings and embodiments, it should be noted that those skilled in the art can easily make various changes and modifications based on the present disclosure. Therefore, it is to be noted that these changes and modifications are within the scope of the present disclosure. For example, it is possible to relocate the functions included in each unit or each step in such a way that they are not logically contradictory, and it is possible to combine a plurality of units or steps into one or to divide a plurality of units or steps.

For example, in the embodiment described above, a part of the configuration and the function of one device or apparatus may be included in another device. In addition, any plurality of devices may be configured as one device. For example, a part of the processing operations performed by the vehicle 10 in the embodiment described above may be performed by the server 20; similarly, a part of the processing operations performed by the server 20 may be performed by the vehicle 10.

It is also possible to allow a general-purpose information processing device, such as a smartphone or a computer, to function as the communication device 11, position information acquisition device 12, or server 20 according to the embodiment described above. More specifically, the program describing the processing for implementing the functions of the server 20 and other devices according to this embodiment is stored in the memory of the information processing device and, then, the processor of the information processing device reads this program for execution. Therefore, the disclosure in this embodiment may be implemented also as a program executable by the processor.

What is claimed is:

1. An information processing system comprising:
a plurality of vehicles; and
a server configured to communicate with the plurality of vehicles, wherein
each of the plurality of vehicles is configured to
detect wind information by using a wind detection device mounted on each of the plurality of vehicles, and
send probe data to the server, the probe data including the wind information and position information on each of the plurality of vehicles at a time when the wind information was detected, and
the server is configured to
store the probe data received from the plurality of vehicles in a database,
determine, based on attribute information on a client, information to be provided to the client, wherein the attribute information includes a client type, vehicle information including a vehicle type of an automobile, a vehicle height, a vehicle weight, whether a vehicle is autonomous, and a model and a specification of a smartphone to which the information is to be provided, and
provide the information to the smartphone by using the probe data stored in the database, wherein
the wind detection device includes a controller, an external speaker, and one or more external receivers,
the controller is configured to detect the wind information based on a sound speed, a vehicle speed, a distance from the external speaker to each of the external receivers, and an arrival time of sound from the external speaker to each of the external receivers, and
the wind information includes at least one of a wind speed and a wind direction.

2. The information processing system according to claim 1, wherein
the server is configured to provide the information by using first specific probe data whose position information indicates a position belonging to a predetermined geographical area, the first specific probe data being among the probe data stored in the database.

3. The information processing system according to claim 2, wherein the server is further configured to generate strong-wind area information that indicates a geographical area in which the wind speed is equal to or higher than a predetermined threshold value.

4. The information processing system according to claim 3, wherein the threshold is determined based on the attribute information on the client.

5. The information processing system according to claim 1, wherein
the probe data further includes time information on a time when the wind information was detected and
the server is configured to provide the information by using second specific probe data whose time information indicates a time belonging to a predetermined time zone, the second specific probe data being among the probe data stored in the database.

6. A non-transitory storage medium storing instructions that, when executed by an information processing device configured to communicate with a plurality of vehicles, cause the information processing device to:
receive probe data from each of the plurality of vehicles, the probe data including wind information detected by using a wind detection device mounted on each of the plurality of vehicles and position information on each of the plurality of vehicles at a time when the wind information was detected;
store the probe data in a database, the probe data being received from the plurality of vehicles;
determine, based on attribute information on a client, information to be provided to the client, wherein the attribute information includes a client type, vehicle information including a vehicle type of an automobile, a vehicle height, a vehicle weight, whether a vehicle is autonomous, and a model and a specification of a smartphone to which the information is to be provided, and
provide the information to the smartphone by using the probe data stored in the database, wherein
the wind detection device includes a controller, an external speaker, and one or more external receivers,
the instructions further cause the information processing device to detect the wind information based on a sound speed, a vehicle speed, a distance from the external speaker to each of the external receivers, and an arrival time of sound from the external speaker to each of the external receivers, and
the wind information includes at least one of a wind speed and a wind direction.

7. An information processing method performed by an information processing system including a plurality of vehicles and a server configured to communicate with the plurality of vehicles, the information processing method comprising:
detecting, by each of the plurality of vehicles, wind information by using a wind detection device mounted on each of the plurality of vehicles;
sending, by each of the plurality of vehicles, probe data to the server, the probe data including the wind information and position information on each of the plurality of vehicles at a time when the wind information was detected;
storing, by the server, the probe data in a database, the probe data being received from the plurality of vehicles;
determining, based on attribute information on a client, information to be provided to the client, wherein the attribute information includes a client type, vehicle information including a vehicle type of an automobile, a vehicle height, a vehicle weight, whether a vehicle is autonomous, and a model and a specification of a smartphone to which the information is to be provided, and
providing, by the server, information to the smartphone by using the probe data stored in the database, wherein
the wind detection device includes a controller, an external speaker, and one or more external receivers,
the method further includes detecting, via the controller, the wind information based on a sound speed, a vehicle speed, a distance from the external speaker to each of the external receivers, and an arrival time of sound from the external speaker to each of the external receivers, and
the wind information includes at least one of a wind speed and a wind direction.

* * * * *